(12) United States Patent
Balasubramanian et al.

(10) Patent No.: US 9,645,807 B2
(45) Date of Patent: May 9, 2017

(54) AUTOMATED DEPLOYMENT OF A CONFIGURED SYSTEM INTO A COMPUTING ENVIRONMENT

(75) Inventors: Swaminathan Balasubramanian, Southfield, MI (US); Robert A. Morgan, Orlando, FL (US); Kenneth W. Roberson, North Richland Hills, TX (US); Cheranellore Vasudevan, Bastrop, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 685 days.

(21) Appl. No.: 13/596,966

(22) Filed: Aug. 28, 2012

(65) Prior Publication Data

US 2014/0068546 A1    Mar. 6, 2014

(51) Int. Cl.
G06F 9/44      (2006.01)
G06F 9/445    (2006.01)

(52) U.S. Cl.
CPC .................................... *G06F 8/61* (2013.01)

(58) Field of Classification Search
CPC ........................................................ G06F 8/61
USPC ........................................................ 717/104
See application file for complete search history.

(56) References Cited

U.S. PATENT DOCUMENTS

| | | |
|---|---|---|
| 6,275,976 B1 | 8/2001 | Scandura |
| 6,305,009 B1 | 10/2001 | Goor |
| 6,654,950 B1 | 11/2003 | Barnishan |
| 6,681,391 B1 | 1/2004 | Marino et al. |
| 6,813,531 B2 | 11/2004 | Coale et al. |
| 7,055,129 B2 | 5/2006 | Ball |
| 7,971,182 B1* | 6/2011 | Vlaovic et al. ............... 717/104 |
| 8,370,800 B2 | 2/2013 | Burke et al. |
| 2002/0143653 A1 | 10/2002 | DiLena et al. |

(Continued)

OTHER PUBLICATIONS

"Patterns for e-business for new IT solutions", web-published article of IBM Corporation, printed on Jun. 10, 2012 from https://www.ibm.com/developerworks/patterns/. 9 pages.

(Continued)

*Primary Examiner* — Li B Zhen
*Assistant Examiner* — Sen Chen
(74) *Attorney, Agent, or Firm* — Marcia L. Doubet

(57) ABSTRACT

Automatically deploying a configured system into a computing environment (such as a cloud computing environment) for execution therein comprises obtaining a configured architecture model describing the configured system, and iteratively evaluating the model to deploy pre-built components for the system and to create and enable a development environment in the computing environment for development of custom-built components needed for the system according to the model. The automated deployment processing further comprises automatically configuring the system; determining a proper installation sequence; allocating resources in the target environment; and installing the required tools and other software that will be needed for execution once the components of the system are deployed. Component metadata is used during the deployment, enabling automated consideration of various factors such as whether component dependencies, resource requirements, and compatibility issues are met.

20 Claims, 8 Drawing Sheets

(56) References Cited

U.S. PATENT DOCUMENTS

| | | | |
|---|---|---|---|
| 2004/0031030 A1 | 2/2004 | Kidder et al. | |
| 2005/0108687 A1* | 5/2005 | Mountain et al. | 717/127 |
| 2005/0289513 A1 | 12/2005 | Chen et al. | |
| 2006/0167665 A1 | 7/2006 | Ata | |
| 2006/0265699 A1 | 11/2006 | Ali et al. | |
| 2007/0234320 A1* | 10/2007 | Gu | G06F 8/41 717/140 |
| 2007/0299835 A1 | 12/2007 | Takeuchi | |
| 2008/0301628 A1 | 12/2008 | Lochmann | |
| 2009/0031276 A1 | 1/2009 | Seno | |
| 2009/0119638 A1* | 5/2009 | Li et al. | 717/101 |
| 2009/0132211 A1 | 5/2009 | Lane et al. | |
| 2009/0144695 A1 | 6/2009 | Vairavan et al. | |
| 2010/0005451 A1 | 1/2010 | Hirose et al. | |
| 2010/0031234 A1* | 2/2010 | Chaar | G06F 8/00 717/113 |
| 2010/0077386 A1 | 3/2010 | Akkiraju et al. | |
| 2010/0223285 A1* | 9/2010 | Biddulph-Krentar | 707/769 |
| 2010/0306356 A1* | 12/2010 | Gao et al. | 709/222 |
| 2011/0004863 A1 | 1/2011 | Feblowitz et al. | |
| 2011/0167409 A1 | 7/2011 | Schadow | |
| 2011/0271252 A1 | 11/2011 | Bnayahu et al. | |
| 2011/0296372 A1* | 12/2011 | Bird et al. | 717/102 |
| 2012/0215734 A1 | 8/2012 | Mowery et al. | |
| 2012/0266168 A1* | 10/2012 | Spivak et al. | 718/1 |
| 2014/0068551 A1 | 3/2014 | Balasubramanian et al. | |

OTHER PUBLICATIONS

"Patterns for e-business for new and enhanced IT solutions", web-published article of IBM Corporation, printed on Jun. 10, 2012 from https://www.ibm.com/developerworks/patterns/index-revised.html. 8 pages.

Lenz, Gunther, et al., "Making the case for Software Factories", web-published article of Microsoft Corporation, printed on Jun. 10, 2012 from http://msdn.microsoft.com/en-us/library/cc496679.aspx. Apr. 2008. 14 pages.

Mell, Peter, et al., "The NIST Definition of Cloud Computing, Recommendations of the National Institute of Standards and Technology", Sep. 2011, 7 pages.

Swaminathan Balasubramanian et al., U.S. Appl. No. 13/596,917, filed Aug. 28, 2012, Office Action, Jul. 31, 2014, 32 pages.

Swaminathan Balasubramanian et al., U.S. Appl. No. 13/596,917, filed Aug. 28, 2012, Office Action, Nov. 7, 2014, 27 pages.

Swaminathan Balasubramanian et al., U.S. Appl. No. 13/596,917, filed Aug. 28, 2012, Office Action, Jan. 16, 2014, 44 pages.

Hasheminejad, et al., "SCI-GA: Software Component Identification using Genetic Algorithm", published by Association Internationale pour les Technologies Objets, 2011; published in Journal of Object Technology, vol. 12, No. 2, 2013, pp. 3:1-34.

Dixit, Anurag, et al., "Software Component Retrieval Using Genetic Algorithms", International Conference on Computer and Automation Engineering, IEEE, 2009. 5 pages.

Wu, Zhi-Qiao, et al., "An optimization framework for reuse component selection in software product line", CCDC'09 Proceedings of the 21st Annual International Conference on Chinese Control and Decision Conference, pp. 1935-1939. Abstract only (web-published abstract by ACM Digital Library, printed on Aug. 29, 2012 from http://dl.acm.org/citation.cfm?id=1715388); 2 pages.

Vijayalakshmi, K., et al., "A new algorithm in assembly for component-based software using dependency chart", International Journal Information Systems and Change Management, vol. 2, No. 3, 2007. 18 pages.

* cited by examiner

310 MyGraphRenderer

320 attributes = {java-version : 1.5, 1.6; jsf-version : 1.2, 2.0; jee-version: 5}

330 other_comps_needed = {XML2Graph Converter; Trinidad Extensions; MyFaces Extensions}

340 other_comps_invalid = {Tomahawk Extensions; Trinidad Renderkit}

350 capacity_metrics = {max_users = 50, disk_per_session = 100GB}

AUTOMATED DEPLOYMENT OF A CONFIGURED SYSTEM INTO A COMPUTING ENVIRONMENT

CROSS-REFERENCE TO RELATED APPLICATION

The present invention is related to commonly-assigned and co-pending U.S. patent application Ser. No. 13/596,917, which is titled "Configuring Assembly of a System using Supplied Architectural Artifacts" (hereinafter, "the related application"), filed on even date herewith and hereby incorporated herein by reference.

BACKGROUND

The present invention relates to computing systems, and deals more particularly with automated deployment of a configured system (which may be comprised of a plurality of software components) into a computing environment (such as a cloud computing environment) for execution therein.

Component-based design often involves identifying the right components—that is, components that meet certain requirements—and putting those components together (often called "integration"). Deploying the components selected for a particular system is a manual process today. This existing approach is typically tedious and error-prone, particularly when there are a large number of components in the system. In addition, manually allocating resources and manually installing all required tools and other components may lead to sub-optimal results, particularly when the deployment is to a cloud computing environment.

BRIEF SUMMARY

The present invention is directed to automatically deploying a configured system into a computing environment (such as a cloud computing environment) for execution therein, and/or for enabling software development therein. In one aspect, this comprises: obtaining a configured architectural model specification describing a system to be deployed into a computing environment for execution therein, the description of the system further comprising a description of each of a plurality of components of the system; analyzing the configured architectural model specification to determine suitability of deploying the system into the computing environment; and responsive to determining that the deploying of the system into the computing environment is suitable, performing the deploying of the system into the computing environment. The analyzing preferably further comprises: identifying, from the model specification, each of at least one of the components which is a pre-built component of the system and each of at least one of the components which is a custom-built component to be developed in the computing environment; and determining whether each of the identified components is capable of execution in the computing environment. The deploying preferably further comprises: for each of the at least one pre-built component, deploying an artifact embodying the pre-built component into the computing environment; and enabling a development environment, in the computing environment, for each of the at least one determined custom-built component. The components may comprise, by way of example, a plurality of software components.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 3 provides an example of a syntax specification that may be used to describe characteristics of a hypothetical deployable software component;

DETAILED DESCRIPTION

Figure 1:
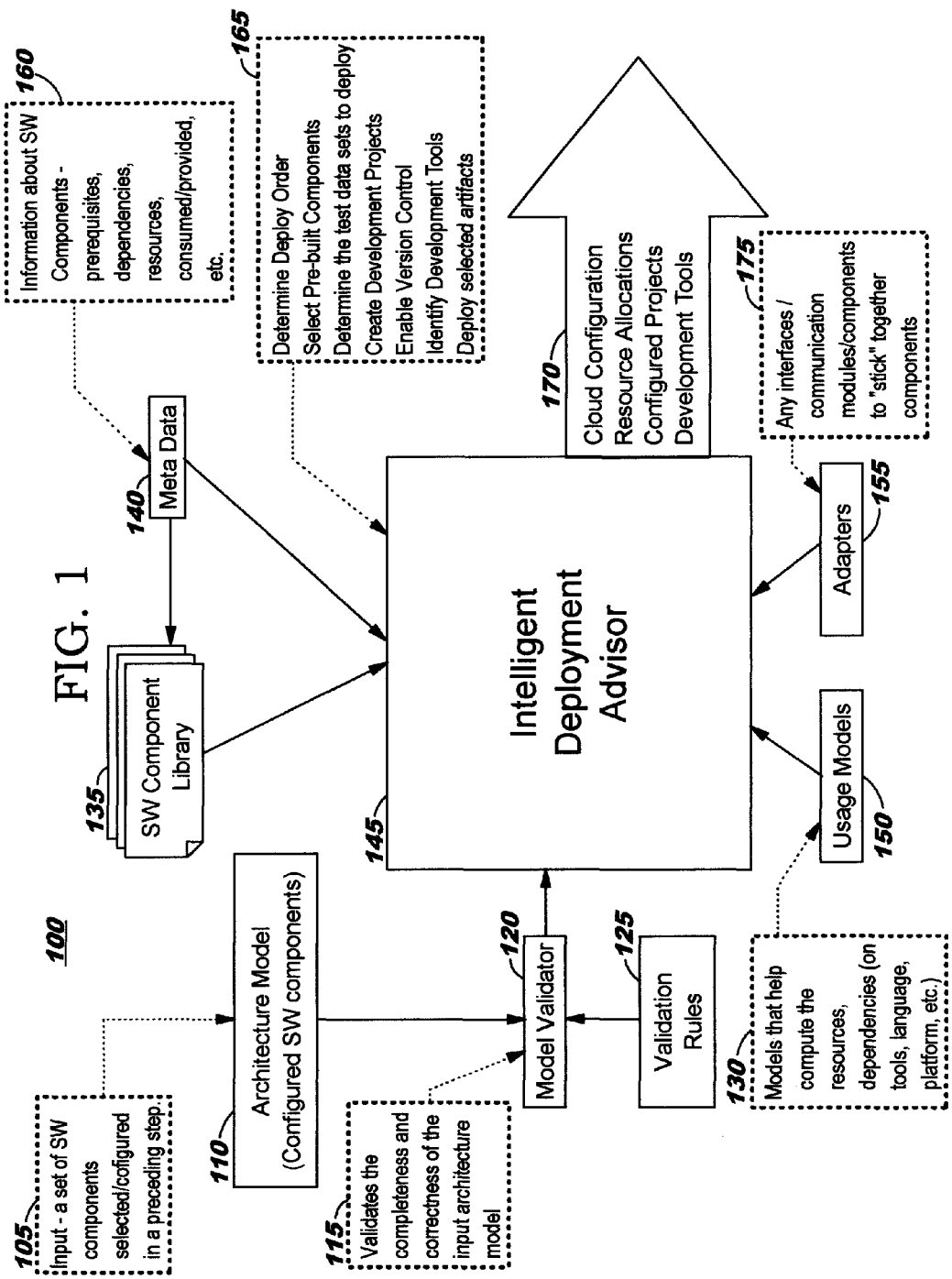
FIG. 1 depicts a block diagram illustrating components that may be used when implementing an embodiment of the present invention, and interactions among those components (by way of illustration, but not of limitation)

As noted earlier, deployment of a configured system into a computing environment (also referred to herein as a "target computing environment"), such as a cloud computing environment, may be a tedious and error-prone process when using known techniques. An embodiment of the present invention is directed toward automated deployment of needed components into such computing environment. Component metadata is used during the deployment, enabling automated consideration of various factors such as whether component dependencies, resource requirements, and compatibility issues (e.g., for tools such as a compiler and operating system, and appropriate versions thereof) are met. As will be discussed in more detail herein, the automated deployment processing further comprises automatically configuring the system; determining a proper installation sequence in which tools, run-time platform, and so forth are set up as well as the order in which the components are installed; allocating resources in the target environment; and installing the required tools and other software that will be needed for execution once the components of the system are deployed. Accordingly, using an embodiment of the present invention will typically reduce the chance for human error in the system setup and deployment, as well as improve the timeliness and consistency of the deployment.

Components of a configured system may comprise some number of pre-built components, which are typically available from a component library, and some number of custom-built components may also be included in a configured system. A custom-built component is generally needed when a suitable pre-built component is not available. Accordingly, an embodiment of the present invention is adapted for determining what tools and other resources are needed for building a custom-built component in the target computing environment, and including those resources in the deployed system so that the development environment can be enabled by the deployment. As an example, a particular development toolkit might be needed (which may comprise a code editor, code samples, various utilities, a compiler, a debugger, etc.), along with various test data, and these resources are then automatically included in the deployment when using an embodiment of the present invention.

As noted earlier, the disclosed techniques may be used for deploying systems comprised of various types of software components. The target computing environment may also include various hardware and/or services on which the deployed system depends, and an embodiment of the present invention includes processing that determines whether those needed resources are available in the target computing environment. Accordingly, while discussions herein are presented primarily with reference to software components, it should be understood that this is by way of illustration but not of limitation and that the scope of the present invention is not limited to systems comprised solely of software components.

Furthermore, it should be understood that although the discussions herein refer to deployment in a cloud computing environment, and provide details describing cloud computing (see, for example, the discussion of FIGS. 6-8, below), implementation of the teachings herein is not limited to a cloud computing environment. Rather, embodiments of the present invention are capable of being implemented in conjunction with any other type of computing environment now known or later developed.

As will be described in further detail herein, an embodiment of the present invention performs automated deployment of a configured system according to a supplied architectural model that describes selected components for the deployment. One way in which the components may be selected and configured, and in which the configured architectural model is created therefrom, is described in the related application. Embodiments of the present invention may be used with components that have been selected and configured in other ways, and/or with models that have been configured in other ways, however, without deviating from the scope of the present invention.

Referring now to FIG. 1, a block diagram 100 is provided that illustrates components which may be used when implementing an embodiment of the present invention, and interactions among those components. In this example, the components and interactions are directed primarily to an embodiment that configures an assembly of software components, although consideration of hardware and/or services may be included as well. (The components and interactions shown in FIG. 1 are provided by way of illustration, but not of limitation, and an embodiment of the present invention may be implemented using fewer, additional, or different components/interactions without deviating from the scope of the present invention. Furthermore, while various functions are discussed as being performed by selected ones of the illustrated components, this is by way of illustration and not of limitation, and the functions may be allocated among components in other ways without deviating from the scope of the present invention.) The components and interactions of FIG. 1 will now be discussed at a high level, and further detail is then provided with reference to subsequent figures.

At the center of FIG. 1 is a so-called "Intelligent Deployment Advisor" 145 (referred to hereinafter as "Advisor 145" or simply "the Advisor"), which carries out automated deployment of a configured system as disclosed herein. Referring first to the output 170 of the Advisor 145, this output generally comprises cloud computing environment configuration for executing the deployed system, resource allocations needed for the subsequent execution of the deployed system, configured projects to be used when developing custom-built components of the deployed system, and development tools for use in developing the custom-built components. As noted at 165, operation of the Advisor generally comprises determining the proper deployment order for the components (e.g., with respect to dependencies among components); selecting pre-built components from a library (see the discussion of library 135, below); determining any test data that should be deployed with the system; creating any development projects needed for developing the custom-built components and enabling version control for those projects, as well as deploying development tools for the custom-built components; and deploying artifacts which embody the pre-built components. (These functions are discussed in further detail herein with reference generally to FIGS. 2-4.) Optionally, a projected support cost of executing the deployed system in the target computing environment may also be generated as an output of the Advisor (and computation thereof may be based, at least in part, on information provided by the usage models 150, which are discussed below).

The various inputs to the Advisor 145 will now be discussed in further detail.

An architecture model 110 (referred to equivalently herein as a "configured architecture model") describes a plurality of configured software components. The software components are selected and configured in a preceding step 105, which may be performed using an embodiment of the related application as noted earlier. Preferably, a model validator 120 performs a validation 115 of the architecture model 110 using a set of validation rules 125, where this validation 115 comprises validating the completeness and correctness of the architecture model 110. This validation may comprise determining whether all of the components in the model are capable of being connected and whether an operational view is available. Validating component connections may further comprise, by way of example, determining availability of any interface code that will be needed for communication among components, and ensuring that such code is included in the deployment if it is not already provided either by a component of the configured model or by the target computing environment. Use of operational views is well known to those of ordinary skill in the art, and a detailed discussion thereof is therefore not provided herein. (Refer to the discussion of FIG. 5 of the related application for an example of an operational view.)

A software component library 135 stores a plurality of available components. Selected ones of these components may be referenced in the configured architecture model 110, such that the Advisor 145 will locate artifacts embodying individual components and include those artifacts in the deployment. A set of metadata 140 provides descriptive information 160 about the available components, such as any prerequisites for using the component, any dependencies the component has on other components, the resources consumed by the component during execution (e.g., run-time CPU usage, run-time memory usage, and so forth), and resources provided or generated by execution of the component (e.g., output data created by the component). (See also the discussion of FIG. 3, below, which illustrates a syntax specification that may be used for such component metadata.)

Usage models 150 are preferably provided as an input to the Advisor, and comprise models 130 that describe projected run-time resource needs and dependencies. The projected resource needs may pertain to CPU usage, memory usage, network bandwidth, and so forth, and may be expressed in terms of peak usage projections and/or average usage projections. (As will be obvious, these are examples and are provided by way of illustration but not of limitation.) The dependencies may refer to various tools that are needed in conjunction with a configured component of the system, language support that will be needed for executing the deployed system and/or for developing custom-built components for the system, platform needs (such as a particular operating system and an identification of one or more versions thereof which will be needed), and so forth. The usage models 150 therefore assist the Advisor in computing the needs of the deployed system, so that an automated determination can be made as to whether the system can be deployed in the computing environment. The projections may also be provided to the target computing environment to indicate an initial level of resources to be allocated for the deployed system, and/or performance levels that indicate when additional resources of various types should be automatically allocated during run-time of the deployed system.

Adaptors 155 may be provided as an input to the Advisor, providing any interfaces and/or communication modules 175 that are needed in order to operably connect deployed components together for execution. As one example, if a deployable Component A is written in a first programming language and it needs to communicate with a deployable Component B written in a second programming language, an adaptor may need to be deployed with the configured components in order to allow these Components A, B to communicate at run time.

Figure 2:
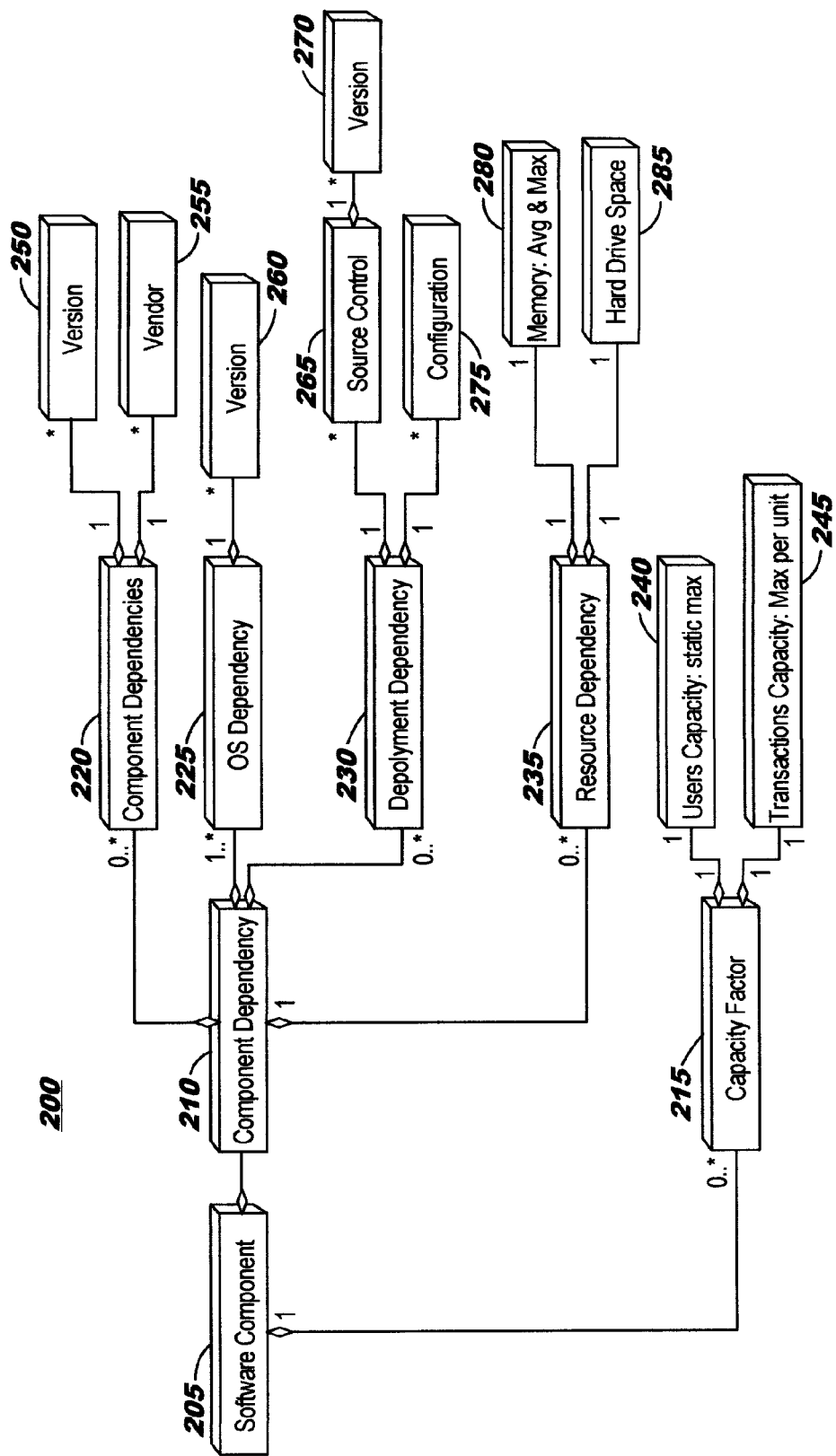
FIG. 2 shows a sample schema metadata which may be used with an embodiment of the present invention.

Referring now to FIG. 2, the well-known Unified Modeling Language ("UML") is used to present a sample schema 200 that illustrates the various types of information that are preferably used when describing a deployable component, such that this component information will be available for use by the Advisor (and/or inputs thereto; see the discussion of FIG. 1, above) as it carries out an automated deployment. At a high level, component-specific information provided to an embodiment of the present invention preferably enables the embodiment to automatically determine—as part of deploying a configured architecture model—what priorities and/or ordering should be enforced among the components to be deployed, what prerequisites are required, and what resources are allocated and/or provided when a software component is instantiated into the target computing environment. Accordingly, the information reflected by the sample schema 200 may be divided generally into 2 main groups: what the component dependencies are, in order to allow the component to be realized into the target computing environment, and resource dependencies of the component, with the resource dependencies including the required resource allocations for the component as well as any needed information about resources generated/provided by the component in the target computing environment once deployed therein. (As discussed in further detail below with reference to resource dependencies 235, this may pertain not only to logical resources that are provided, but also to capacity/volume metrics usable for scalability computations.)

Individual elements of the sample schema 200 will now be discussed.

Software component 205 is a container element that is used to describe a specific deployable unit in the system. This deployable unit is also referred to herein as an "artifact". The realization of software component 205 contains information that denotes the main set of attributes or characteristics describing a particular deployable component, and may further comprise general descriptive information (such as the component's name, a Uniform Resource Locator or "URL" from which the component can be obtained, installable object code for the component, and so forth).

Each software component 205 may have various dependencies, which are shown generally at component dependency 210. In the general case, instances of component dependency 210 describe any required components and prerequisite attributes that need to be present in the target computing environment for this component to properly execute. The information may be in the form of a specific software component identification, in more generic terms that identify a needed resource (which may, for example, identify a component that can be sourced from a number of different software components), or in terms of capacity-based resources. As an example of a specific software component identification, a component dependency 210 may specify that a particular version of a named component from a particular vendor is required. As an example of identifying a needed resource using more generic terms, a component dependency 210 might specify a requirement for Java version 1.5 or any later version thereof, or for a relational database management system that supports certain functions. Examples of specifying capacity-based resources include: an instance of this component requires 500 MB of disk space allocated; an instance of this component requires a minimum of 4 GB of dedicated RAM; etc. Several types of dependencies are shown (by way of illustration but not of limitation) in FIG. 2 at reference numbers 220, 225, 230, and 235, and will now be described.

Instances of component dependencies 220 facilitate identifying any dependencies among components. A particular configured component of the architecture model may rely on information from a database, for example, and therefore the database must be deployed in the target computing environment and would therefore be described as a dependency of the particular configured component. An instance of component dependencies 220 further provides for identifying a particular version 250 and/or vendor 255 of the depended-on component (and multiple instances of component dependencies 220 may be used when it is desired to identify a plurality of suitable versions and/or vendors).

An instance of operating system dependency 225 may be used to identify any dependencies that a deployable component 205 has on an operating system in the target computing environment. This may further comprise identifying a required version 260 of the operating system. If a particular component is operable with multiple operating systems and/or multiple versions thereof, then this may be indicated by a corresponding element 225 and version 260 for each such operating system and version.

Instances of deployment dependency 230 may be used for identifying any deployment dependencies for this deployable component 205. It is noted that some software components may require an amount of configuration or customization before they can be used in the target computing environment. A software component may also require specific user development effort in order to effectively use the software, and the functionality it provides, within the target computing environment. Accordingly, instances of deployment dependency 230 may be used to identify the need for user intervention and the storage of the resulting user input, and this in turn preferably drives the deployment or allocation of space in a library during the deployment of the configured system. For example, the Advisor may determine from instance of deployment dependency 230 that the user needs to provide a user ID and password for accessing a database that forms part of the deployed system, in which case this user ID and password may be stored in a library control system that will supply these values automatically during run time. As another example, an instance of deployment dependency 230 may identify a module that needs to be deployed to enable other components to communicate. As yet another example, an instance of deployment dependency 230 may be used when there is data that is needed by the deployable component 205 for proper execution, including (but not limited to) data for populating a data store, transformations to be applied to data, and test data for use when testing the deployed system and/or when testing a custom-built component that is to be built in the target computing environment. As an example of transformations to be applied, test data might be provided in a default format, and a user might then be asked to customize this default data during the deployment effort (for example, to replace placeholder customer IDs with a set of customer IDs that will properly function in the deployed system). When using instances of deployment dependency 230 for identifying data according to these examples, the Advisor may then capture the user-identified test data, custom scripts, load tools, etc. as needed for populating a data store that will be used by the deployable component 205.

User-provided configuration and customizations may be stored in a library control system that enables them to be backed out (i.e., reversed) if needed. Accordingly, information provided with an instance of deployment dependency 230 may further identify (by way of illustration but not of limitation) a source control system 265 and suitable version(s) 270 thereof. Instances of deployment dependency 230 may also specify particular configuration information 275.

Any resource dependencies for this component 205 are identified with instances of resource dependency 235, where these instances preferably provide information such as what resources are needed and/or provided when the component 205 is deployed into the target computing environment. By way of illustration but not of limitation, an instance of resource dependency 235 may further specify memory usage 280, which may comprise metrics for the average memory usage and the maximum memory usage, and hard drive space 285.

Information provided by instances of resource dependency 235 may be used, along with information provided by instances of component dependencies 220, to determine a particular deployment order among the deployable components 205 when carrying out the deployment of a configured architecture model.

Instances of capacity factor 215 may be used to enable the Advisor to determine what is being asked of the target computing environment, and/or to specify information that assists the Advisor in determining the scalability of deployable component 205 and of the overall deployable system. Information represented by instances of capacity factor 215 may therefore serve as gating factors that determine whether or not the target computing environment is capable of supporting the system to be deployed, and for allocating resources in the target computing environment if so. Some capacity factors may be specified as static or fixed values.

By way of illustration but not of limitation, FIG. 2 shows capacity factor 215 as further including users capacity 240 (which may be specified as a static, maximum value, as noted in the figure) and transactions capacity 245 (which may be specified as a maximum per unit, as noted in the figure). Accordingly, as an example of a static factor, a capacity factor 215 instance might indicate that deployable component 205 can support a maximum of 50 concurrent users. Other capacity factors may be specified as dynamic values, or transactional values that are affected by volume or traffic. As an example of a dynamic factor, an instance of capacity factor 215 might indicate that component 205 requires 10 MB of RAM and 100 GB of disk space for each user session.

The information represented by schema 200 may be specified in various formats without deviating from the scope of the present invention. Name and value pairs may be used, for example, where the name portion of a name/value pair describes a certain characteristic (such as "Version") and the value portion of the name/value pair specifies a value for that characteristic (such as "1.0.0"). An example of using syntax that includes name/value pairs to describe several characteristics of a hypothetical deployable software component is provided in FIG. 3. For this example, consider a hypothetical deployable component that can be invoked to render a graph as a diagram on a user interface. Suppose that this component uses a Java® Server Faces (hereinafter, "JSF") implementation to perform the rendering, meaning that various Java services from the JSF implementation must be in place in the deployed system if this component is to function therein. ("Java" is a registered trademark of Oracle Corporation in the United States, other countries, or both.) In the example of FIG. 3, the component name "MyGraphRenderer" is specified at 310, and particular attributes of this component are specified at 320. For example, the attributes syntax 320 specifies that this component requires either version 1.5 or 1.6 of the Java runtime environment (having keyword "java-version", in this example), either version 1.2 or 2.0 of the JSF software (having keyword "jsf-version"), and version 5 of the Java platform (having keyword "jee-version"). Note that the attribute syntax 320 may be interpreted as specifying prerequisite components. Co-requisite components for the hypothetical graph renderer component are identified in the syntax at 330, and the syntax at 340 provides a list of components that are incompatible with the hypothetical graph renderer component. Finally, the syntax at 350 specifies capacity metrics for the hypothetical graph renderer component, which in this example are a static maximum number of users and a per-session amount of disk space needed.

Figure 4:
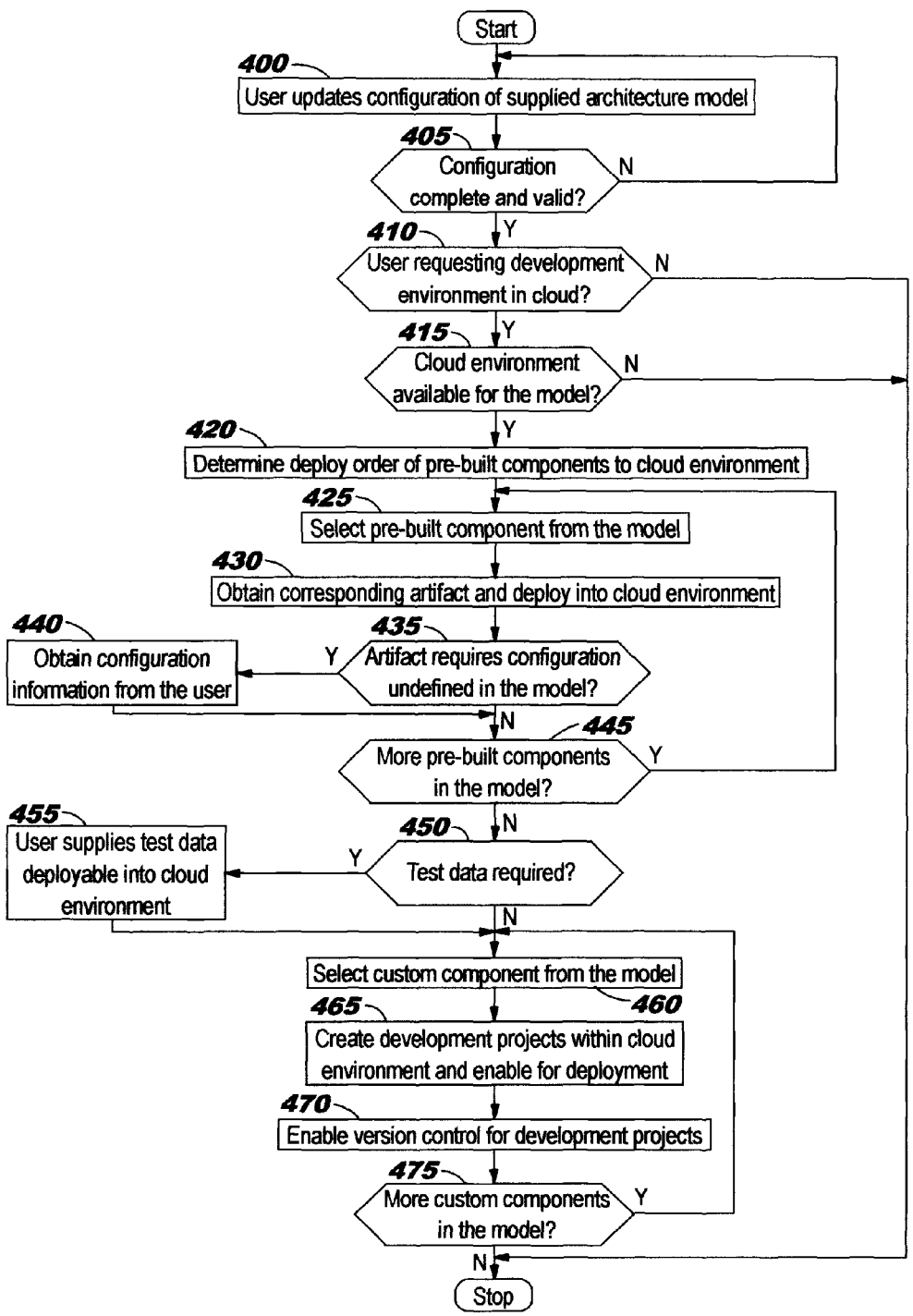
FIG. 4 provides a flowchart depicting logic which may be used when implementing an embodiment of the present invention.

Referring now to FIG. 4, a flowchart is provided therein depicting logic which may be used when implementing an embodiment of the present invention. This processing begins with an identified configured architecture model, which may have been created according to the related application. Optionally, a user may provide updates to configuration information of this model at Block 400. For example, the model might identify multiple choices for a particular pre-built component, and the processing of Block 400 may then comprise asking the user to select one of these choices. Such updates are included when an embodiment of the present invention determines the suitability of deploying the configured system to the target computing environment, as well as ensuring that all needed components are deployed.

Block 405 tests whether the configured architecture model is complete and valid. If not, then control returns to Block 400 to obtain further information from the user. When the test at Block 405 has a positive result, then processing continues at Block 410.

Block 410 tests whether the user is requesting to deploy the configured system into a target computing environment, which is a cloud computing environment in a preferred embodiment. If not, then the deployment may use techniques which are outside the scope of the present invention, and the processing of FIG. 4 therefore exits. Otherwise, processing continues at Block 410, which tests whether the target environment is available for deployment of the system represented by the configured architecture model. This test preferably comprises evaluating what makes up the system, and determining whether the target computing environment can support all of the components (including component-specific dependencies and other requirements). For example, suppose the system represented by the configured model indicates that it requires WebSphere® version 8.0 but the target computing environment only supports WebSphere versions 7.0 and earlier. In this example, the system represented by the configured model specification cannot be deployed into the target computing environment. Accordingly, when the test at Block 415 has a negative result, the processing of FIG. 4 exits. Otherwise, processing continues at Block 420.

Block 420 determines the deployment order of pre-built components to the target computing environment. This preferably comprises evaluating dependencies specified for various pre-built components (as discussed above with reference to 210 of FIG. 2, and more particularly, with reference to 230), and ordering the deployment accordingly. For example, if installing a deployable Component A requires reading markup language files, then Component A will need a parser that can parse the tags of the markup language files, and the parser must therefore be installed prior to attempting to install Component A.

Once the deployment order has been determined at Block 420, an iterative process begins at Block 425, where a pre-built component is selected from the model. A corresponding artifact embodying the selected pre-built component is obtained (for example, from library 135 of FIG. 1) and deployed into the target computing environment at Block 430. Block 435 then tests whether this artifact requires additional configuration information beyond what is already specified in the configured model, and if so, the additional information is preferably obtained from the user at Block 440. This additional configuration information is generally artifact-specific, and may correspond to post-deployment information that will be needed by the deployed system at run time. (In addition or instead, the user may be asked to supply additional configuration information to be used with a development environment that will be deployed for developing custom-built components.) As one example, if the artifact is a database management system, then additional configuration information obtained at Block 440 may comprise a user ID and password for use with this database management system at run time.

Block 445 is reached after the user supplies additional configuration information at Block 440, and when the test at Block 435 has a negative result. Block 445 then tests whether there are any more pre-built components of the model (as ordered by the deployment order determined by Block 420) that have not yet been processed. When this test has a positive result, control returns to Block 425 to begin the processing of the next such pre-built component. Otherwise, processing continues at Block 450.

Block 450 tests whether the system represented by the configured model will need any test data when it is deployed in the target computing environment. If so, then at Block 455, the user is preferably prompted to supply the appropriate test data (which may comprise, for example, supplying a URL that identifies a network-accessible location of a file containing the test data). For example, suppose a database management system is among the components being deployed. It may be desirable to perform at least some amount of verification testing after installation of the database management system, and Block 455 may therefore obtain such test data.

Note that as an alternative to requesting test data from the user at Block 455 (i.e., during the deployment process), the identification of the test data may be provided in an earlier step (e.g., as the architecture model is configured by an embodiment of the related application).

Block 460 is reached after the user supplies the test data at Block 455, and when the test at Block 450 has a negative result. Block 460 then begins an iterative process to enable, within the target computing environment, the development of custom-built components for the system represented by the configured architecture model. Preferably, a project will be set up and configured for each component that is to be custom built, and the user may specify configuration for the development environment. Various known formats for packaging modules together for deployment may be leveraged, such as the well-known WAR (web application archive) and EAR (enterprise archive) formats, by way of illustration but not of limitation. Version control is preferably provided, within the target computing environment, for the custom components that are to be built. Accordingly, if such features are not already present in the target computing environment, then they are included with the deployment of the configured architecture model according to an embodiment of the present invention. (In addition, it should be noted that while FIG. 4 illustrates creating and enabling development environments for custom-built components identified in the configured architecture model, this is by way of illustration and not of limitation. In an alternative approach, it may be desired to always perform this creating and enabling of a development environment, even if no custom components are identified in the configured architecture model, thereby allowing development of yet-to-be-identified components within the target computing environment in the future if needed.)

Block 460 begins the iterative processing of custom-built components by selecting a custom-built component from the model. At least one corresponding development project for developing the custom-built component within the target computing environment is created and enabled for deployment at Block 465. This may comprise using projected storage or consumption metrics to allocate storage and/or other resources for the development project. Block 470 preferably enables version control for the development project(s) created at Block 465. Block 475 then tests whether there are more custom-built components that have not yet been processed. When this test has a positive result, control returns to Block 460 to begin the processing of the next such custom-built component. Otherwise, the deployment of the system represented by the configured architecture model is now complete, and the processing of FIG. 4 therefore exits.

Figure 5:
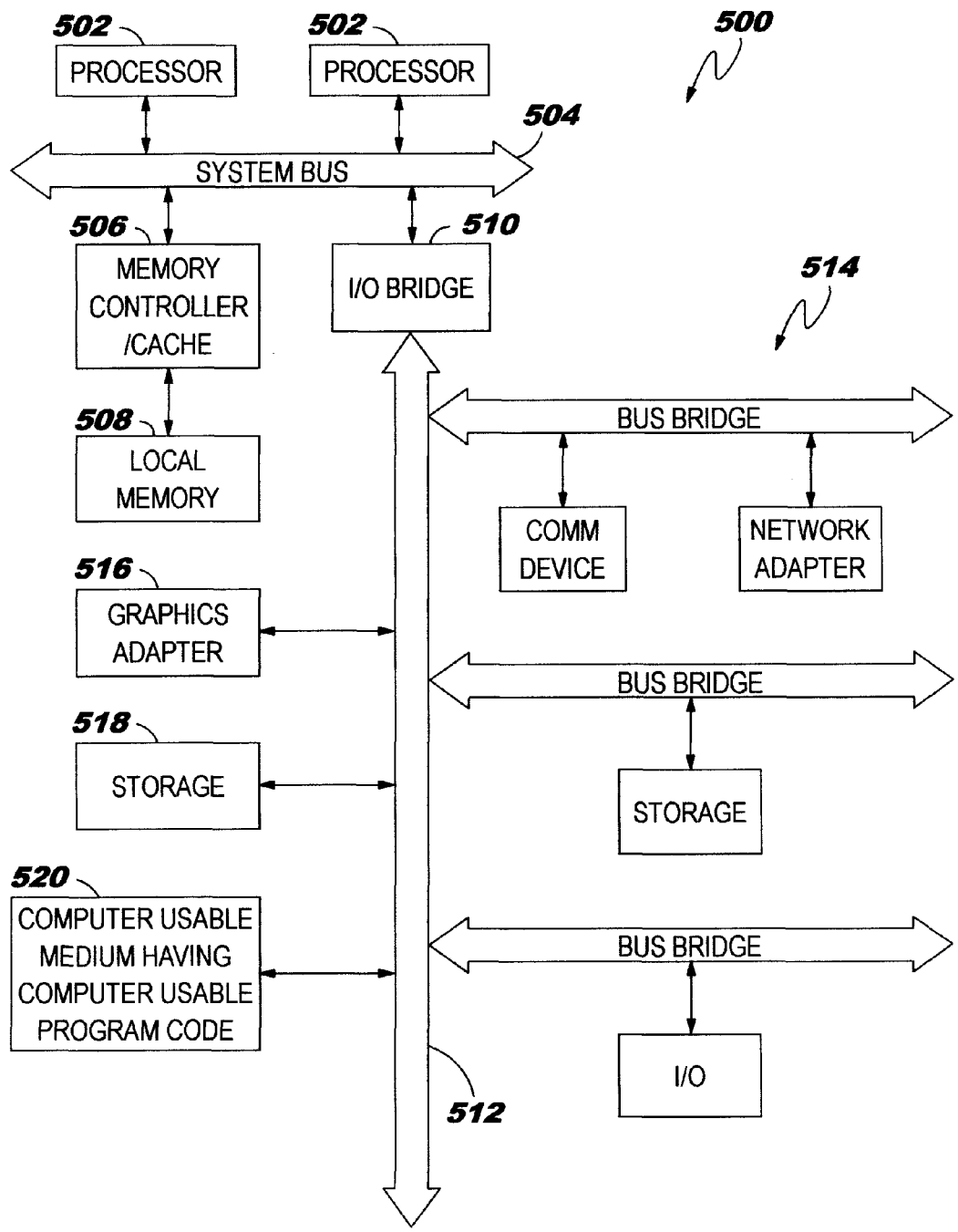
FIG. 5 depicts a data processing system suitable for storing and/or executing program code.

Referring now to FIG. 5, a block diagram of a data processing system is depicted in accordance with the present invention. Data processing system 500, which may be used to provide processing described herein, may comprise a symmetric multiprocessor ("SMP") system or other configuration including a plurality of processors 502 connected to system bus 504. Alternatively, a single processor 502 may be employed. Also connected to system bus 504 is memory controller/cache 506, which provides an interface to local memory 508. An I/O bridge 510 is connected to the system bus 504 and provides an interface to an I/O bus 512. The I/O bus may be utilized to support one or more buses 514 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 516, storage 518, and a computer usable storage medium 520 having computer usable program code embodied thereon. The computer usable program code may be executed to execute any aspect of the present invention, as such aspects have been described herein.

The data processing system depicted in FIG. 5 may be, for example, an IBM System P® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both.)

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

As noted earlier, an embodiment of the present invention may deploy a system represented by a configured architecture model into a cloud computing environment. Information pertaining to a cloud computing environment will now be discussed with reference to FIGS. 6-8.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-Demand Self-Service: A cloud consumer can unilaterally provision computing capabilities, such as server time and network storage, as needed automatically without requiring human interaction with the service's provider.

Broad Network Access: Capabilities are available over a network and accessed through standard mechanisms that promote use by heterogeneous thin or thick client platforms (e.g., mobile phones, laptops, and PDAs).

Resource Pooling: The provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid Elasticity: Capabilities can be rapidly and elastically provisioned, in some cases automatically, to quickly scale out, and these capabilities can be rapidly released to quickly scale in. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: The cloud infrastructure is operated solely for an organization. It may be managed by the organization or a third party and may exist on-premises or off-premises.

Community Cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The cloud infrastructure is made available to the general public or a large industry group and is owned by an organization selling cloud services.

Hybrid Cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
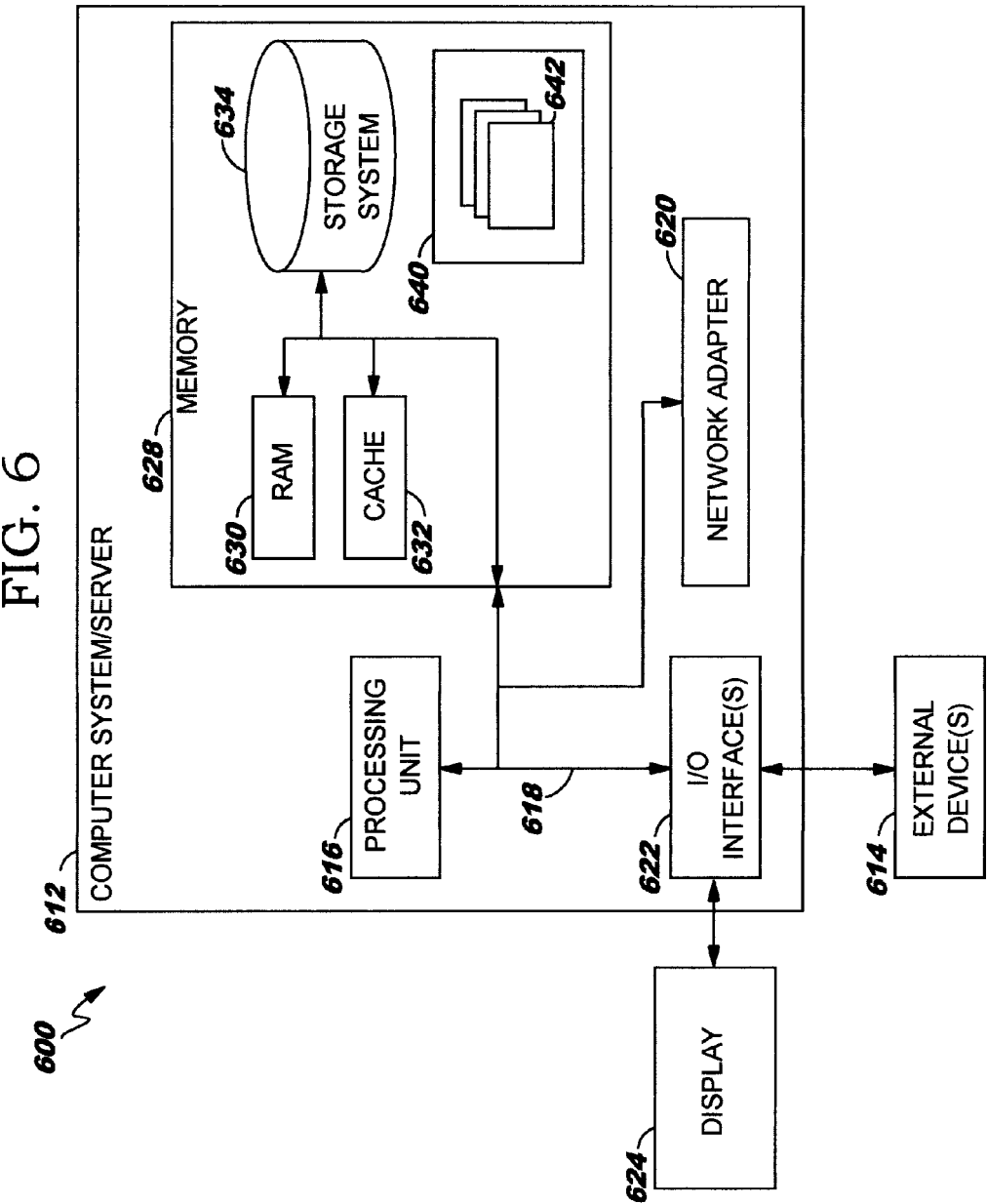
FIG. 6 depicts a cloud computing node according to an embodiment of the present invention.

Referring now to FIG. 6, a schematic of an example of a cloud computing node is shown. Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 600 is shown in the form of a general-purpose computing device. The components of computer system/server 612 may include, but are not limited to, one or more processors or processor units 616, a system memory 628, and a bus 618 that couples various system components including system memory 628 to processor unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 618 by one or more data media interfaces. As will be further depicted and described below, memory 628 may include at least one program product having a set (e.g., at least one) of program modules that are configured to carry out the component development and/or execution within the cloud computing environment.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via I/O interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to: microcode, device drivers, redundant processing units, external disk drive arrays, RAID systems, tape drives, data archival storage systems, etc.

Figure 7:
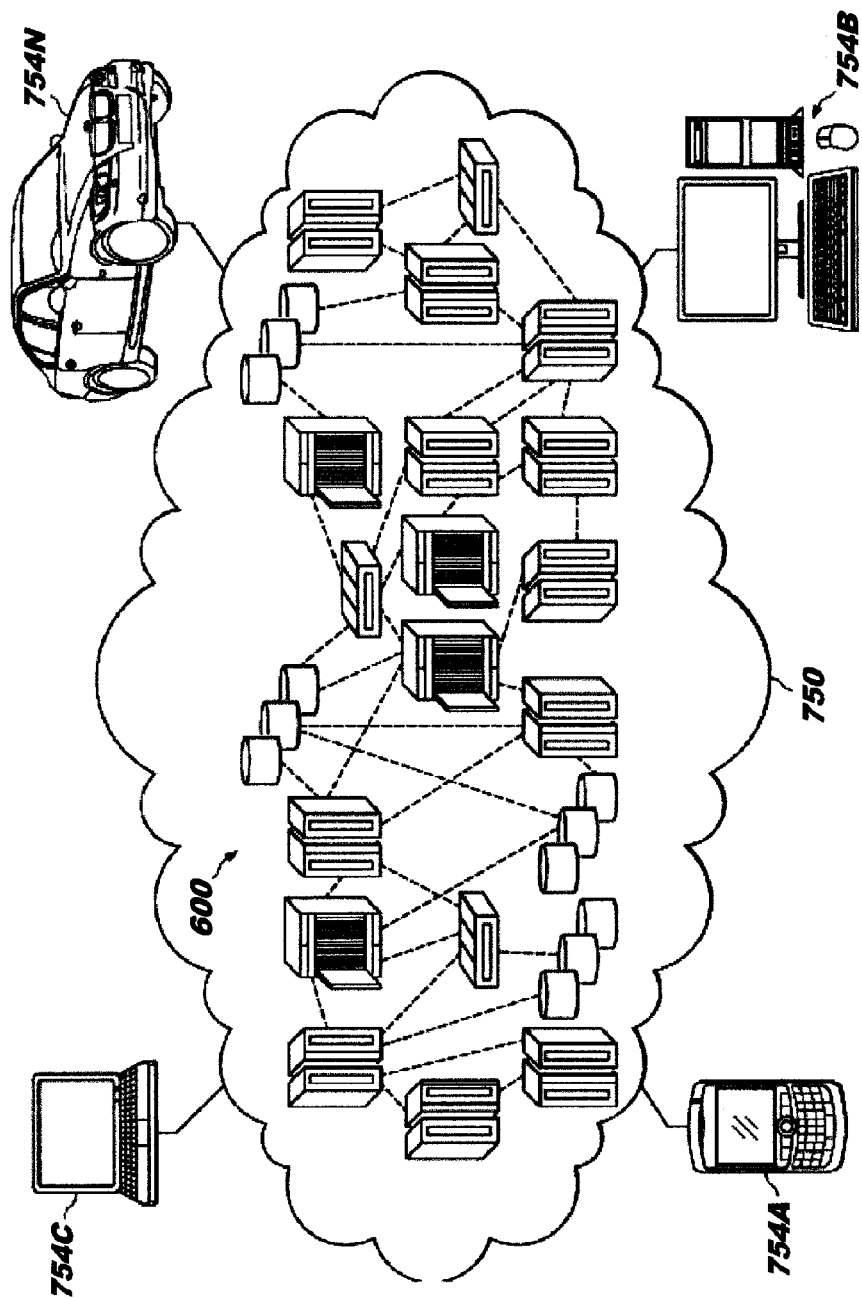
FIG. 7 depicts a cloud computing environment according to an embodiment of the present invention.

Referring now to FIG. 7, illustrative cloud computing environment 750 is depicted. As shown, cloud computing environment 750 comprises one or more cloud computing nodes 600 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms, and/or software as services for which a cloud consumer does not need to maintain resources on a local computing device. It is understood that the types of computing devices 754A-N shown in FIG. 7 are intended to be illustrative only and that computing nodes 600 and cloud computing environment 750 can communicate with any type of computerized device over any type of network and/or network addressable connection (e.g., using a web browser). Program code located on one of nodes 600 may be stored on a computer recordable storage medium in one of nodes 600 and downloaded to a computing device within computing devices 754A-N over a network for use in these computing devices. For example, a server computer in computing nodes 600 may store program code on a computer readable storage medium on the server computer. The server computer may download the program code to a client computer in computing devices 754A-N for use on the client computer.

Figure 8:
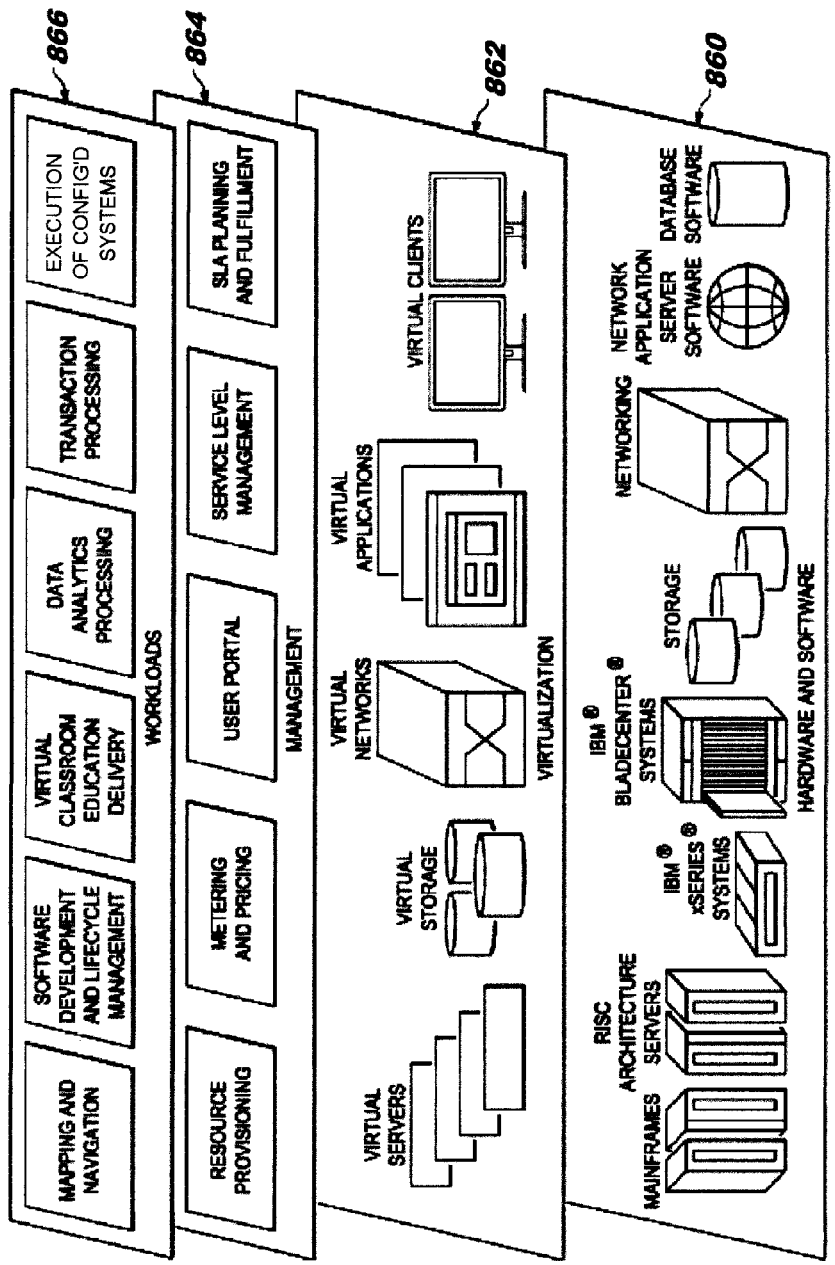
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. ("IBM", "zSeries", "pSeries", "xSeries", "BladeCenter", and "DB2" are registered trademarks of International Business Machines Corporation in the United States, other countries, or both.)

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and pricing provide cost tracking as resources and are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and execution of configured systems in a cloud computing environment, where such systems may have been deployed as disclosed herein.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method for automated deployment of a configured system into a target computing environment for enabling software development therein, comprising using a processor of a first computer of a first computing environment to perform:
 obtaining a configured architectural model specification describing a system to be deployed into a target computing environment for execution therein, the description of the system in the configured architectural model specification further comprising a description of each of a plurality of components of the system to be deployed, wherein:
  at least one of the plurality of described components is a pre-built component of the configured system and is to be deployed into the target computing environment;
  at least one of the plurality of described components is a custom-built component of the configured system that is as-yet unbuilt and is to be built in the target computing environment; and
  the first computing environment is communicatively coupled to the target computing environment;
 analyzing the configured architectural model specification to determine suitability of deploying the system into the target computing environment, further comprising:
  identifying, from the model specification, each of the at least one of the pre-built components and each of the at least one of the custom-built components;
  determining, from component-specific information in the configured architectural model specification, whether each of the identified components is capable of execution in the target computing environment, the component-specific information for the each component comprising dependencies of the each component; and
  determining that the deploying of the system into the target computing environment is suitable if the determining determines that each of the identified components is capable of execution in the target computing environment; and
 responsive to determining that the deploying of the system into the target computing environment is suitable, performing the deploying of the system into the target computing environment, further comprising:
  determining, from the component-specific information in the configured architectural model specification, an install sequence for each of the identified components and resources required, in the target computing environment, by each of the identified components; and
  deploying the identified components into the target computing environment according to the determined install sequence, further comprising:
   for each of the at least one pre-built component, deploying an artifact embodying the pre-built component into the target computing environment, the artifact being identified from the component description in the configured architectural model specification; and
   for each of the at least one custom-built component, determining, from the component description in the configured architectural model specification, corresponding development tools and resources needed in the target computing environment for enabling a user to subsequently build the custom-built component therein and automatically deploying the corresponding component development tools and the resources into the target computing environment.

2. The method according to claim 1, wherein the target computing environment is a cloud computing environment.

3. The method according to claim 1, wherein determining that the deploying of the system into the target computing environment is suitable further comprises determining that the system is complete and valid according to the description specified in the configured architectural model specification.

4. The method according to claim 1, wherein determining whether each of the identified components is capable of execution in the target computing environment further comprises:
 determining capabilities of the target computing environment; and
 concluding, for each individual one of the identified components, that the individual one is capable of execution in the target computing environment if requirements of the individual one are met by the determined capabilities of the target computing environment.

5. The method according to claim 1, wherein deploying an artifact further comprises, for each individual one of the pre-built components:
   determining any artifact-specific configuration parameters needed for the artifact embodying the individual one; and
   responsive to determining that a value for at least one of the needed artifact-specific configuration parameters is not defined in the description of the pre-built component within the model specification, obtaining the value for the not-defined artifact-specific configuration parameter and setting the value for the not-defined artifact-specific configuration parameter to the obtained value.

6. The method according to claim 5, wherein the obtaining the value further comprises prompting a user to supply the value and receiving the value in response.

7. The method according to claim 1, wherein determining the install sequence further comprises:
   determining, from the model specification, any install-time dependencies among the plurality of components; and
   defining the install sequence, among the components, according to the any determined install-time dependencies.

8. The method according to claim 1, wherein performing the deploying further comprises:
   determining, from the model specification, whether test data is required in the target computing environment for any of the components; and
   responsive to determining that the test data is required for any of the components, obtaining the test data and deploying the test data into the target computing environment.

9. The method according to claim 1, wherein deploying the corresponding development tools further comprises, for each individual one of the custom-built components:
   creating a development project for the individual one;
   enabling the created development project, in the enabled development environment; and
   enabling version control for the created development project, in the enabled development environment.

10. A system for automated deployment of a configured system into a target computing environment for execution therein, comprising:
    a first computer of a first computing environment, the first computer comprising a processor; and
    instructions which are executable, using the processor, to implement functions comprising:
       obtaining a configured architectural model specification describing a system to be deployed into a target computing environment for execution therein, the description of the system in the configured architectural model specification further comprising a description of each of a plurality of components of the system to be deployed, wherein:
          at least one of the plurality of described components is a pre-built component of the configured system and is to be deployed into the target computing environment;
          at least one of the plurality of described components is a custom-built component of the configured system that is as-yet unbuilt and is to be built in the target computing environment; and
          the first computing environment is communicatively coupled to the target computing environment;
       analyzing the configured architectural model specification to determine suitability of deploying the system into the target computing environment, further comprising:
          identifying, from the model specification, each of the at least one of the pre-built components and each of the at least one of the custom-built components;
          determining, from component-specific information in the configured architectural model specification, whether each of the identified components is capable of execution in the target computing environment, the component-specific information for the each component comprising dependencies of the each component; and
          determining that the deploying of the system into the target computing environment is suitable if the determining determines that each of the identified components is capable of execution in the target computing environment; and
       responsive to determining that the deploying of the system into the target computing environment is suitable, performing the deploying of the system into the target computing environment, further comprising:
          determining, from the component-specific information in the configured architectural model specification, an install sequence for each of the identified components and resources required, in the target computing environment, by each of the identified components; and
          deploying the identified components into the target computing environment according to the determined install sequence, further comprising:
             for each of the at least one pre-built component, deploying an artifact embodying the pre-built component into the target computing environment, the artifact being identified from the component description in the configured architectural model specification; and
             for each of the at least one custom-built component, determining, from the component description in the configured architectural model specification, corresponding development tools and resources needed in the target computing environment for enabling a user to subsequently build the custom-built component therein and automatically deploying the corresponding component development tools and the resources into the target computing environment.

11. The system according to claim 10, wherein determining whether each of the identified components is capable of execution in the target computing environment further comprises:
    determining capabilities of the target computing environment; and
    concluding, for each individual one of the identified components, that the individual one is capable of execution in the target computing environment if requirements of the individual one are met by the determined capabilities of the target computing environment.

12. The system according to claim 10, wherein deploying an artifact further comprises, for each individual one of the pre-built components:

determining any artifact-specific configuration parameters needed for the artifact embodying the individual one; and
responsive to determining that a value for at least one of the needed artifact-specific configuration parameters is not defined in the description of the pre-built component within the model specification, obtaining the value for the not-defined artifact-specific configuration parameter and setting the value for the not-defined artifact-specific configuration parameter to the obtained value.

13. The system according to claim 10, wherein determining the install sequence further comprises:
determining, from the model specification, any install-time dependencies among the plurality of components; and
defining the install sequence, among the components, according to the any determined install-time dependencies.

14. The system according to claim 10, wherein performing the deploying further comprises:
determining, from the model specification, whether test data is required in the target computing environment for any of the components; and
responsive to determining that the test data is required for any of the components, obtaining the test data and deploying the test data into the target computing environment.

15. A computer program product for automated deployment of a configured system into a target computing environment for enabling software development therein, the computer program product comprising:
a non-transitory computer readable storage medium having computer readable program code embodied therein, the computer readable program code executable on a first computer of a first computing environment and configured for:
obtaining a configured architectural model specification describing a system to be deployed into a target computing environment for execution therein, the description of the system in the configured architectural model specification further comprising a description of each of a plurality of components of the system to be deployed, wherein:
at least one of the plurality of described components is a pre-built component of the configured system and is to be deployed into the target computing environment;
at least one of the plurality of described components is a custom-built component of the configured system that is as-yet unbuilt and is to be built in the target computing environment; and
the first computing environment is communicatively coupled to the target computing environment;
analyzing the configured architectural model specification to determine suitability of deploying the system into the target computing environment, further comprising:
identifying, from the model specification, each of the at least one of the pre-built components and each of the at least one of the custom-built components;
determining, from component-specific information in the configured architectural model specification, whether each of the identified components is capable of execution in the target computing environment, the component-specific information for the each component comprising dependencies of the each component; and
determining that the deploying of the system into the target computing environment is suitable if the determining determines that each of the identified components is capable of execution in the target computing environment; and
responsive to determining that the deploying of the system into the target computing environment is suitable, performing the deploying of the system into the target computing environment, further comprising:
determining, from the component-specific information in the configured architectural model specification, an install sequence for each of the identified components and resources required, in the target computing environment, by each of the identified components; and
deploying the identified components into the target computing environment according to the determined install sequence, further comprising:
for each of the at least one pre-built component, deploying an artifact embodying the pre-built component into the target computing environment, the artifact being identified from the component description in the configured architectural model specification; and
for each of the at least one custom-built component, determining, from the component description in the configured architectural model specification, corresponding development tools and resources needed in the target computing environment for enabling a user to subsequently build the custom-built component therein and automatically deploying the corresponding component development tools and the resources into the target computing environment.

16. The computer program product according to claim 15, wherein determining whether each of the identified components is capable of execution in the target computing environment further comprises:
determining capabilities of the target computing environment; and
concluding, for each individual one of the identified components, that the individual one is capable of execution in the target computing environment if requirements of the individual one are met by the determined capabilities of the target computing environment.

17. The method according to claim 15, wherein deploying an artifact further comprises, for each individual one of the pre-built components:
determining any artifact-specific configuration parameters needed for the artifact embodying the individual one; and
responsive to determining that a value for at least one of the needed artifact-specific configuration parameters is not defined in the description of the pre-built component within the model specification, obtaining the value for the not-defined artifact-specific configuration parameter and setting the value for the not-defined artifact-specific configuration parameter to the obtained value.

18. The computer program product according to claim 15, wherein determining the install sequence further comprises:

determining, from the model specification, any install-time dependencies among the plurality of components; and defining the install sequence, among the components, according to the any determined install-time dependencies.

19. The computer program product according to claim 15, wherein performing the deploying further comprises:

determining, from the model specification, whether test data is required in the target computing environment for any of the components; and responsive to determining that the test data is required for any of the components, obtaining the test data and deploying the test data into the target computing environment.

20. The computer program product according to claim 15, wherein deploying the corresponding development tools further comprises, for each individual one of the custom-built components:

creating a development project for the individual one;

enabling the created development project, in the enabled development environment; and enabling version control for the created development project, in the enabled development environment.

* * * * *